United States Patent Office 3,264,797
Patented August 9, 1966

3,264,797
APPARATUS FOR THE PRODUCTION OF CHRISTMAS CRACKERS
Philip Steward Powling and John William Crollie, Ilford, England, assignors to Neilsons Gaiety Limited, London, England
Filed Apr. 24, 1963, Ser. No. 275,331
15 Claims. (Cl. 53—285)

This invention relates to methods of making bon bon crackers, sometimes called Christmas crackers or cosaques, which will hereinafter be referred to generally as crackers.

Crackers can be made in a number of ways, using different kinds and arrangements of materials but in a typical method of construction a rectangular sheet of material such as crepe paper, which forms the outside of the finished cracker, is assembled with similar sheets of plain paper. A smaller sheet of cardboard, forming a stiffener, is placed over the middle third of the sheets. A snap, which gives the characteristic "crack" when the cracker is pulled is assembled with the sheets. This assembly of parts is referred to in the trade as a "sticking."

However the sticking is made, it is shaped to form a cylinder and a constriction or "waist" is made roughly a third of the distance along the length of the cylinder. The constriction is as tight as may be, and it is made by an operator winding a string round the cylinder, usually twice, and pulling the string endwise. Once the one constriction has been made the filling of the cracker, consisting of novelties, favours, and the like are dropped into the centre of the cylinder and a second waist is formed.

The hand forming of these waists is slow and tedious and accounts for a large portion of the time and the cost of making a cracker. Though attempts have been made in the past to obviate hand tying of the cracker in this way none, so far as we are aware, has proved commercially acceptable.

The present invention is concerned with an improved method of and means for tying crackers and the like and according to one aspect of the invention there is provided apparatus for forming the waist in a cracker comprising two support members and cord-like means supported on each of said members and presenting a series of spans defining a polygonal figure of a size suitable to permit the insertion therein of a cracker cylinder, relative movement of said members causing the size of the figure to be reduced thereby to create a waist in a cylinder inserted within the figure.

According to another aspect of the invention, there is provided a method of forming the waist in a cracker comprising the steps of inserting the cracker cylinder within a polygonal figure defined by a series of flexible spans, and reducing the figure to create a waist in the cracker cylinder.

Further features and advantages of the invention will be apparent from the following description of an embodiment thereof, given, by way of example, in conjunction with the accompanying drawings in which.

Figure 1:
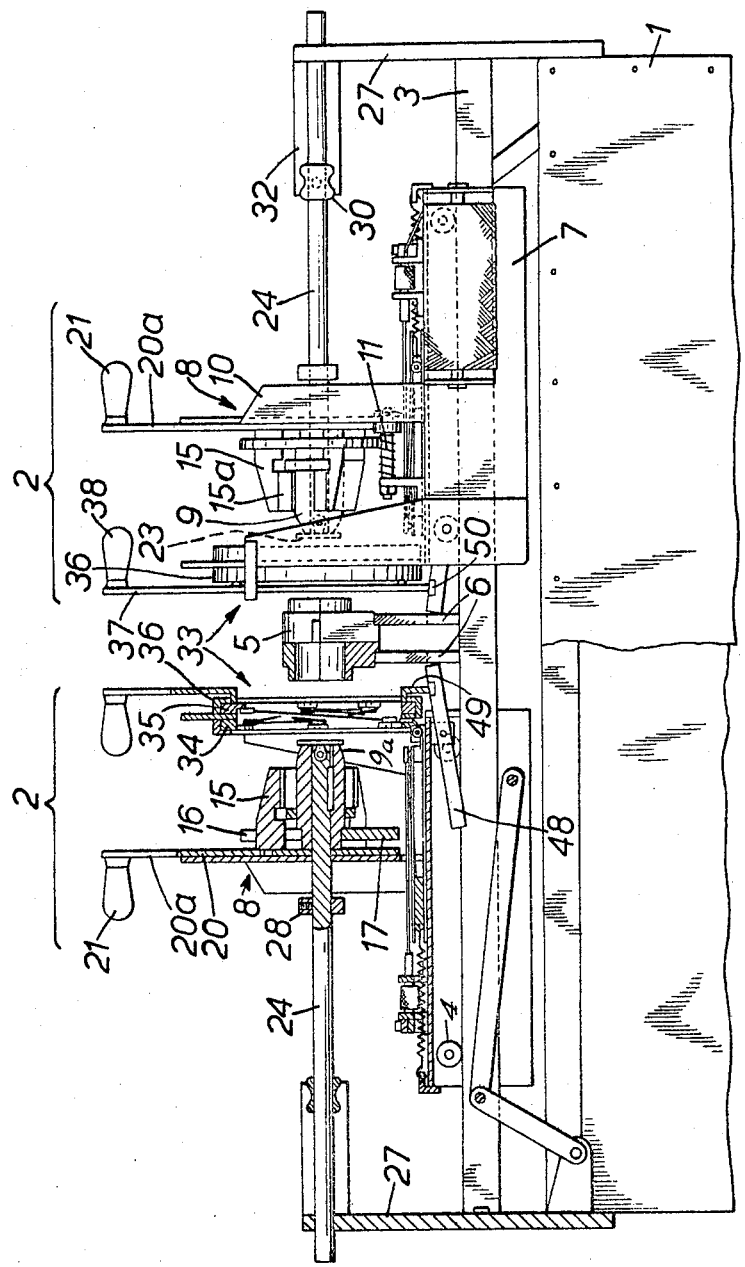
FIGURE 1 is side elevation, partly in section of the apparatus.
Figure 2:
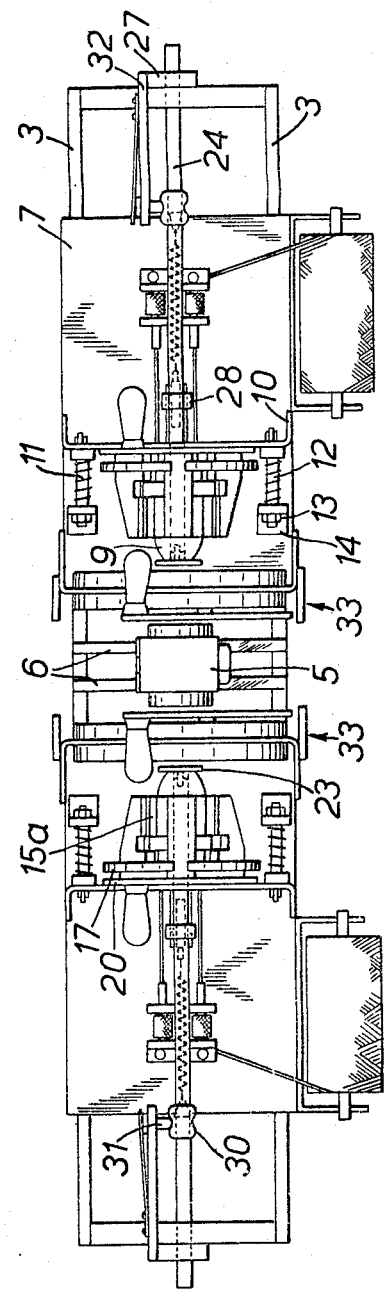
FIGURE 2 is a plan view of the apparatus.
Figure 3:
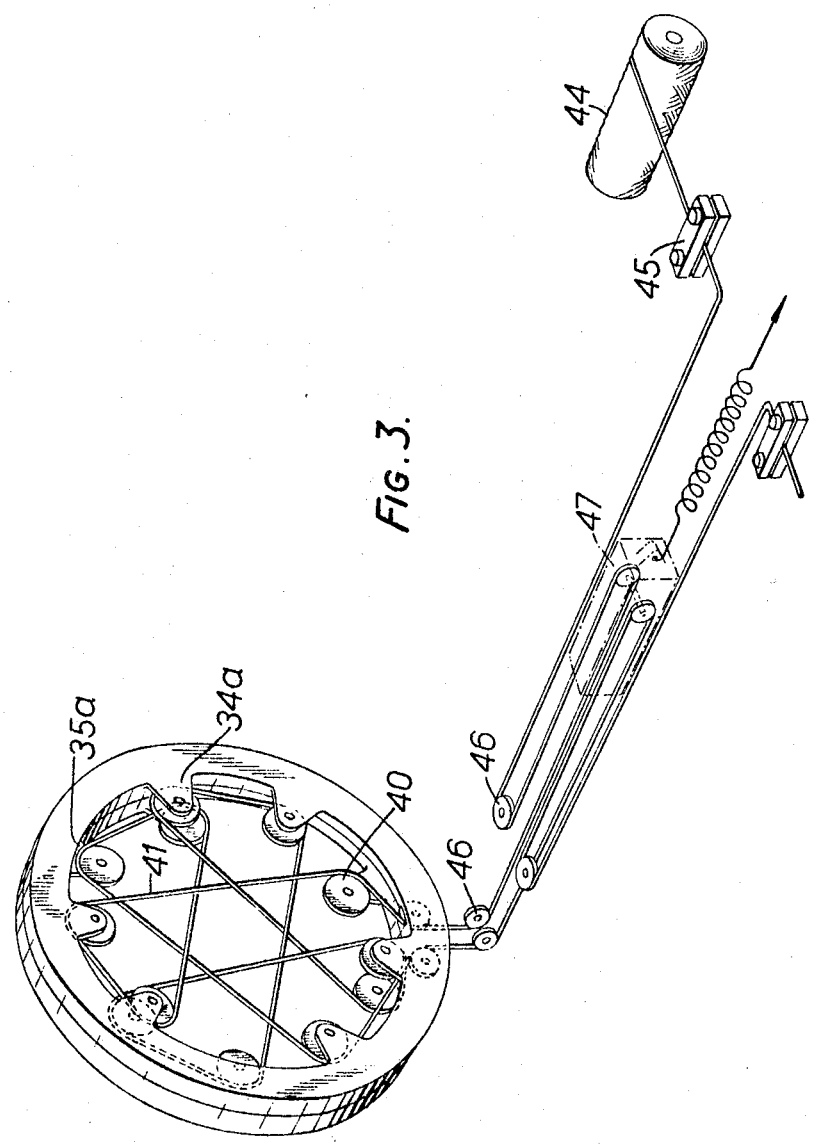
FIGURE 3 is a perspective view of the cording arrangement of the tier device.

In the manufacture of crackers by the method and apparatus now to be described, a sticking is made into a preferably coherent cylinder and the filling inserted into the middle of the cylinder. The cylinder is held at its end and two waist-forming devices are positioned about the cylinder, the devices each consisting of a number of spans of cord or the like forming a figure of polygonal shape. The devices are actuated, in a manner described in more detail hereinafter, so as in effect to reduce the figure contained by the cords, thus constricting the cylinder and forming the waists.

In the above method, the constituents of a typical sticking, namely crepe paper, plain paper and cardboard, are fed from rolls to a machine where they are stuck together to form a continuous sheet, the sheet then being cut up to provide the individual stickings. Before leaving the machine, the stickings are given a slight curvature by passing them through a pair of pressure rollers. Each sticking is then transferred to a forming device which shapes it into a cylinder and secures the cylinder by, for example, an adhesive or staples. Prior to securing, the snap is inserted between the overlapping edges of the sticking. The cylinder is now transferred to and located on a mandrel where the novelties, favours and the like are inserted, the mandrel also acting as a stop to ensure the correct positioning of the filling.

Preferably, the filling is made up in such a way, as by being made into a resilient package, that the filling can be inserted in the cylinder and retained there frictionally, to prevent it moving or falling out of the cylinder. Often the filling includes a paper hat; in such a case the hat can be used to surround or wrap the other parts of the filling to form the package, which will be lightly compressed when it is inserted in the cylinder. The charged cylinder is now ready to be transferred to a waist-forming apparatus in accordance with the invention.

Referring to the drawings, the apparatus comprises a generally rectangular framework 1, two similar waist-forming mechanisms 2 slidable on guide members 3, of the framework, and a clamp 5 carried by cross members 6 and adapted to retain the charged cylinder in position prior to, and during, the waist-forming operation. Each mechanism 2 comprises a carriage 7 movable on guide members 3, by means of rollers 4 and carrying a device 8 for supporting and clamping an end of the charged cylinder. The device 8 has a hollow cylindrical mandrel 9 of diameter substantially equal to that of the "charged" cylinder and tapered as at 9a to facilitate entry of the mandrel into the open end of the cylinder. The mandrel 9 is supported by a flanged-plate 10 slidable on carriage 7 and biased by a pair of springs 11 to a limit position, the biasing force and limit position being adjustable by means of a bolt 12, nut 13 and bracket 14 secured to carrier 7. Co-operating with the non-tapered portion of mandrel 9 are three clamping members 15 having arcuate portions 15a and slidable in radially extending slots 16 formed in an annular disc 17 secured to mandrel 9. Adjacent disc 17 is a co-axial disc 20 rotatable relative to disc 17 and provided with an integral extension 20a and handle 21, rotation of disc 20 causing the members 15, by means of a simple cam arrangement (not shown) to clamp onto the surface of the mandrel 9. The disc 20 is retained in the clamping position by a spring loaded latch which engages a notch in the periphery of the disc.

Also co-operating with mandrel 9 is a metal disc 23 of diameter substantially equal to that of the mandrel, the purpose of the disc being to provide a support for the cylinder adjacent the stiffener during the waist-forming operation. To avoid fouling the edges of the paper cylinder, the disc 23 enters the end of the paper cylinder in an approximately horizontal position, and is rotated into the vertical plane just prior to the waist being formed. This action is achieved by pivotally mounting the disc 23 about a horizontal axis on a rod 24 co-axial with the mandrel, the disc being biased to the horizontal position due to its own weight. The rod 24 is slidable supported by the mandrel 9 and by a vertical frame-member 27. Intermediate the ends of the rod is a stop 28 and a detent mechanism in the form of a shaped cam 30 on the rod co-operating with a spring-biased stop 31 carried by an extension piece 32 of member 27, the function of the stop 28 and the detent mechanism will be explained in more detail hereinafter.

The carriage 7 also carries a tying device 33 consisting of a number of spans of cord forming a figure of polygonal shape. When the device is actuated in the tying position, the figure, defined by the spans and surrounding the cylinder adjacent the stiffener, is reduced thus constricting the cylinder and forming the waist. The device 33 comprises two co-axial annular rings 34, 35, of which ring 34 is fixed to a support 36 bolted to carriage 7, ring 35 being rotatable relative to ring 34 by means of a lever 37 and handle 38. Each ring has six inwardly extending integral projections 34a, 35a on which six grooved pulleys 40 are rotatably mounted. A cord 41, preferably of nylon, is fed over the pulleys in the following manner; the pulleys being consecutively numbered I to VI. The cord first passes over pulley I on ring 35, then over pulleys VI and V respectively on ring 34, then over pulleys II and III respectively on ring 35, then over pulleys IV and III respectively on ring 34, then over pulleys IV and V respectively on ring 35, then over pulleys II and I respectively on ring 34 and finally over pulley VI on ring 35. After leaving the tying circuit, the cord passes via a series of pulleys 46 to a spring tensioning device 47 which ensures that the slack cord is pulled out of the tying circuit after each tying operation. The cord is fed into the circuit from a rotatably mounted bobbin 44 through a non-slip cord-feeder 45.

When ring 35 is angularly rotated, the figure defined by the cords is reduced in size until the cord spans meet on the axis of the rings 34, 35. In the fully actuated position of ring 35, each cord span passes through the diametral position to take up a wide V-shape which is interlocked at its apex with the other spans to provide a tightly formed knot. With the above tying circuit the cord is not worn excessively in one spot and also, when a length, say, of one hundred yards of cord has been passed through the circuit, the tier device 33 can be rethreaded so that the cord is fed back through the tying circuit in an opposite direction, this can be repeated several times before the cord has to be replaced.

To limit the inward movement of the waist-forming mechanism 2 toward the paper cylinder, the carriage 7 has a counterweighted stop 48 which engages cross member 6. For reasons that will appear later, the carriage 7 is permitted to travel a further ½" or so nearer the centre of the apparatus during the tying operation, and to effect this, the ring 35 has a cam 49 which engages a roller 50 provided on stop 48 and which causes the stop to be knocked below the cross member 6 allowing the carriage to come into contact with the spans of cord 41.

Operation of the apparatus is as follows. The operator clamps a "charged" cylinder in position in clamp 5 and slides the two carriages 7 along guide members 3 toward the paper cylinder, this movement being limited by the engagement of stops 48 with cross members 6. During the initial part of this movement, each disc 23 lies in a horizontal plane until it enters the end of the "charged" cylinder. At this point, stop 31 of the detent mechanism comes into contact with the leading edge of cam 30 causing the rod 24 to stop momentarily and mandrel 9 to come into engagement with disc 23 thus rotating it to its vertical position. When stops 48 engage members 6, the detent mechanism is in the position shown in FIGURE 1. The operator then simultaneously clamps the ends of the charged cylinder between the mandrels 9 and members 15a by angularly rotating disc 20 of each device 8, the discs remaining in the clamped position due to the latch mechanism. With the ends securely clamped, the operator simultaneously rotates the two operating levers 37 of the two tier devices 33. During the tying action, the crepe of the cylinder begins to stretch over the disc 23 which is positioned on one side of the plane of the cord 41, and over the cardboard stiff on the other side. Soon after the commencement of the tying action, cam 49 on the tier device knocks stop 48 below the cross member 6 and permits the carriage 7 to travel a further distance, say ½", toward the charged cylinder until the disc 23 comes into contact with the spans of cord 41. Almost simultaneously the clamping devices 8 also move due to the pull of the crepe, against the action of their bias toward tier devices 33, causing cam 30 to move to the inward side of stop 31. These movements relieve the strain on the crepe, avoid tearing, and enable the final tying to impart the desired finish and compactness necessary to ensure that no alteration of the shape of the cracker occurs during storage.

To release the formed cracker from the apparatus, the operator returns the clamping devices 8 and tier devices 33 in that order to their inoperative positions and then slides the two carriages 7 toward their outer positions. During the initial part of this movement, the rod 24 remains stationary due to the action of the detent mechanism, and mandrel 9 therefore moves away from the disc 23 permitting it to resume its stable horizontal position. The disc is removed from the end of the formed cracker in this position when the device 8 engages the stop 28 on rod 24.

The formed cracker can then be released from the clamp 5, leaving the apparatus ready to receive a further charged cylinder. It will be appreciated that the above sequence of operations can be carried out very quickly.

The tying operation is affected by variable conditions such as quality or stretch of the paper cylinder, the temperature and humidity of the atmosphere in the factory, and to minimise the effect of these conditions, it is essential that provision is made to vary the length of paper between the stiffener and the disc 23. This is done by making the stops 48 or the cross members 6 adjustable in a direction of the guides.

In an improvement, not shown, the clamp 5 is omitted and the apparatus is provided with an automatic feed mechanism. This feed mechanism comprises four automatic cylindrical clamps equally spaced on the circumference of a rotatably mounted wheel. This wheel is positioned on the centre line of the apparatus and is adapted to pick up the unformed crackers and to convey them to the tying position, that is to say, the position defined by clamp 5. By rotating the feed mechanism through 90° after each tying operation, another unformed cylinder is conveyed to the apparatus, the formed cracker is released, and another unformed cracker is picked up.

Figure 4:
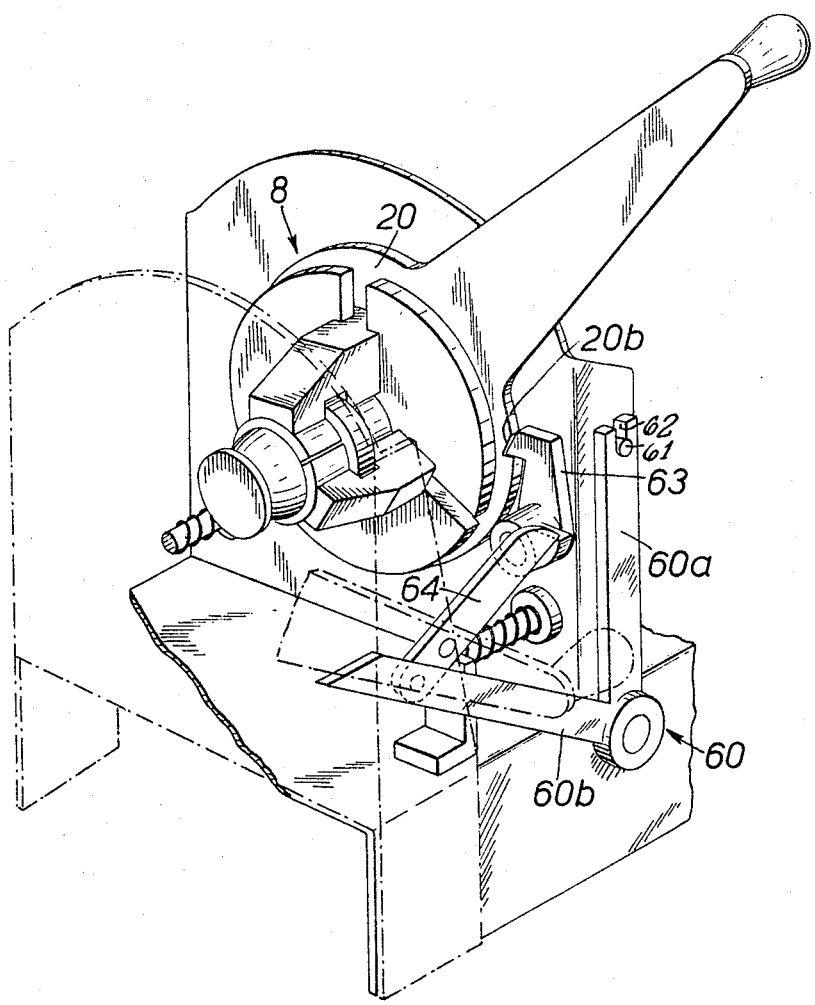
FIGURE 4 is a perspective view of the clamping device showing the automatic release mechanism.
Figure 5:
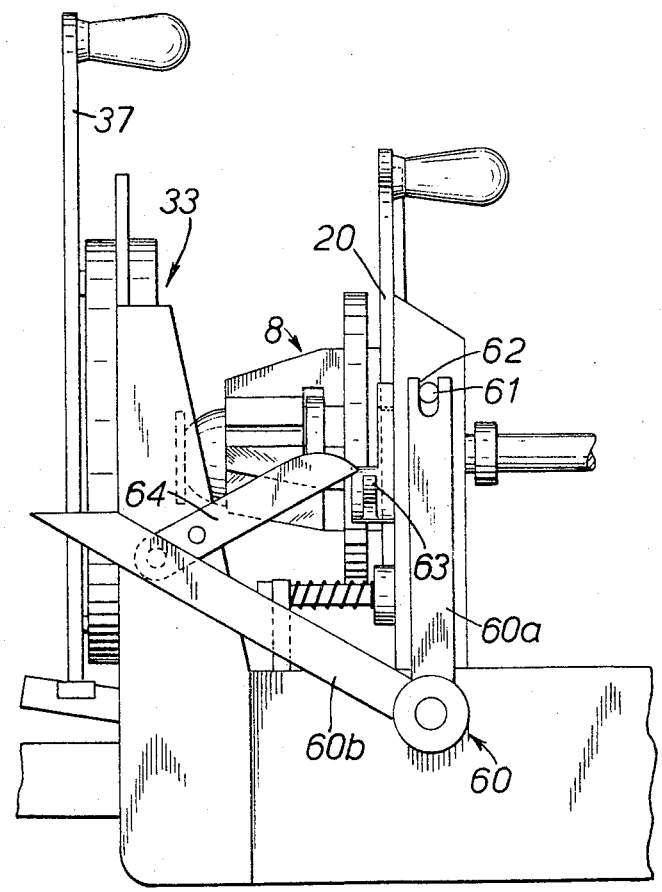
FIGURE 5 is a side view of the release mechanism, showing the lever arrangement in more detail.

Referring to FIGURES 4 and 5, each clamping device 8 has associated with it a V shaped lever 60 pivotally mounted on the carriage 7 carrying the device. One arm 60a of the lever is attached to the device by any suitable means, for example by a pin 61 on the device located in a slot 62 formed in the arm 60a, and the other arm 60b is positioned to engage the operating lever 37 of the waist forming device 33 during the end part of its stroke. The device 8 is retained in its operative position by a suitably shaped spring loaded latch 63 engaging a notch 20b in the disc 20 of the device and also co-operating with an inclined guide 64 attached to the support of device 33. When the arm 60b is engaged by the lever 37, the lever 60 is caused to pivot about its axis and device 8 to move toward the device 33. This movement brings the latch 63 into contact with the guide 64 and causes the latch to pivot against its bias thus allowing disc 20 to return automatically under its own bias to an inoperative position.

In this way, the separate operation of returning the levers of the clamping devices is eliminated thereby speeding up the operation of the waist-forming apparatus.

We claim:

1. Apparatus for forming the waist in a cracker comprising two relatively rotatable coaxial rings, a plurality of rotatably mounted pulley members carried on each ring, a continuous cord presenting a series of spans defining a polygonal figure of a size suitable to permit the insertion therein of a cracker cylinder supported on said pulley members, each said span extending between a pulley member on one ring and a pulley member on the other ring, relative movement of said rings being effective to cause the size of said figure to be reduced, thereby creating a waist in a cracker cylinder inserted within the figure and a rotatably mounted bobbin mounted to feed said cord to said pulley members.

2. Apparatus according to claim 1, and including a tensioning device co-operating with said cord to take up the slack created after each waisting operation.

3. Apparatus for forming the waist in a cracker comprising two relatively rotatable coaxial rings, a plurality of rotatably mounted pulley members carried on each ring, a continuous cord presenting a series of spans defining a polygonal figure of a size suitable to permit the insertion therein of a cracker cylinder supported on said pulley members, each said span extending between a pulley member on one ring and a pulley member on the other ring, relative movement of said rings being effective to cause the size of said figure to be reduced, thereby creating a waist in a cracker cylinder inserted within the figure, a base member, means for clamping a cracker cylinder in position on said base member, carriage means carrying said rings and slidably movable on said base member toward said clamping means so that said spans can be positioned to surround the region of the cracker cylinder to be waisted, a stop for limiting movement of said carriage means toward said clamping means, said stop being removable during the waisting operation to allow the carriage means to move towards said clamping means, thereby relieving the strain on the cracker cylinder and a cam member associated with one of said rings and cooperating with said stop to remove it from the path of the carriage means during the waisting operation.

4. Apparatus for forming the waist in a cracker comprising two relatively rotatable coaxial rings, a plurality of rotatably mounted pulley members carried on each ring, a continuous cord presenting a series of spans defining a polygonal figure of a size suitable to permit the insertion therein of a cracker cylinder supported on said pulley members, each said span extending between a pulley member on one ring and a pulley member on the other ring, relative movement of said rings being effective to cause the size of said figure to be reduced, thereby creating a waist in a cracker cylinder inserted within the figure, a base member, means for clamping a cracker cylinder in position on said base member, carriage means carrying said rings and slidably movable on said base member toward said clamping means so that said spans can be positioned to surround the region of the cracker cylinder to be waisted, a stop for limiting movement of said carriage means toward said clamping means, said stop being removable during the waisting operation to allow the carriage means to move towards said clamping means, thereby relieving the strain on the cracker cylinder and a device for supporting and clamping an end of the cracker cylinder.

5. Apparatus according to claim 4, wherein said device comprises a generally cylindrical mandrel adapted to be inserted into the cracker cylinder, and a plurality of clamping members adapted to clamp the cylinder between said mandrel and said clamping members.

6. Apparatus according to claim 5, wherein said mandrel has a tapered portion to facilitate entry into said cracker.

7. Apparatus according to claim 5, and including a support disc co-operating with said mandrel and of diameter substantially equal thereto, said support disc being inserted into the cracker cylinder to provide a support therefor adjacent the stiffener during the waist forming operation.

8. Apparatus according to claim 4 wherein said device is carried by a support member slidably movable on said carriage means and biased to a limit position away from said clamping means.

9. Apparatus according to claim 8, and including means for adjusting said limit position.

10. Apparatus according to claim 7, wherein said support disc is so mounted that it assumes a position to facilitate entry into the cylinder and on entry assumes a position transverse to the cylinder.

11. Apparatus according to claim 7 wherein said support disc is pivotally mounted on an elongated member co-axial with, and slidably movable in, a bore in said mandrel.

12. Apparatus according to claim 7, wherein said support disc is counterweighted such that it enters the cracker cylinder in an approximately horizontal position.

13. Apparatus according to claim 12, and including stop means co-operating with said elongated member such that after said support disc has entered the cracker cylinder in an approximately horizontal position, the mandrel is caused to move relatively to said elongated member until it engages the support disc and rotates it to said transverse position.

14. Apparatus according to claim 4, and including means for automatically releasing said clamping device during the end part of the waist forming operation.

15. Apparatus according to claim 14, wherein said release means comprises a lever which is moved by a waist-forming operating lever during the latter part of its stroke, and which causes a latch retaining said clamping members to be released.

References Cited by the Examiner

UNITED STATES PATENTS

| | | | |
|---|---|---|---|
| 1,960,759 | 5/1934 | Stelling | 53—38 X |
| 2,569,850 | 10/1951 | Falconer | 53—370 X |
| 2,746,225 | 5/1956 | Cloud | 53—370 |

FRANK E BAILEY, *Primary Examiner.*

L. S. BOUCHARD, *Assistant Examiner.*